United States Patent [19]

Donaghy

[11] Patent Number: 5,797,164
[45] Date of Patent: Aug. 25, 1998

[54] DOVETAIL REFRIGERATOR DOOR HANDLE LOCK

[75] Inventor: David J. Donaghy, Gowen, Mich.

[73] Assignee: White Consolidated Industries, Inc., Cleveland, Ohio

[21] Appl. No.: 565,412

[22] Filed: Nov. 30, 1995

[51] Int. Cl.⁶ .............................. A47B 95/02; A47J 45/00
[52] U.S. Cl. .................. 16/111 R; 16/DIG. 24; 16/114 R; 403/381
[58] Field of Search .................. 16/124, 125, 126, 16/111 R, 114 R, DIG. 24; 49/460; 403/381; 312/348.6, 401, 405

[56] References Cited

U.S. PATENT DOCUMENTS

| | | |
|---|---|---|
| 1,209,676 | 12/1916 | Cooper . |
| 1,272,899 | 7/1918 | Berko ............................ 403/381 |
| 2,175,632 | 10/1939 | Maga ............................ 16/114 R |
| 2,203,413 | 6/1940 | Hood ............................ 16/125 |
| 2,417,620 | 3/1947 | Soderberg ..................... 16/125 |
| 2,459,658 | 1/1949 | Klein ............................ 16/114 R |
| 2,870,493 | 1/1959 | Beyrle .......................... 16/111 R |
| 3,152,818 | 10/1964 | Ivins ............................ 16/114 R |
| 3,182,367 | 5/1965 | Hamann et al. . |
| 3,648,411 | 3/1972 | Saunders et al. ............ 16/114 R |
| 3,707,016 | 12/1972 | Smoot .......................... 16/125 |
| 3,766,598 | 10/1973 | Roberts ........................ 16/125 |
| 3,863,391 | 2/1975 | Horvay et al. . |
| 3,995,349 | 12/1976 | Roberts et al. .............. 16/125 |
| 4,087,141 | 5/1978 | Roberts ........................ 16/125 |
| 4,296,958 | 10/1981 | Stranders . |
| 4,404,709 | 9/1983 | Janz et al. .................... 16/111 R |
| 4,545,698 | 10/1985 | Koch . |
| 4,634,193 | 1/1987 | Liu .............................. 16/114 R |
| 4,745,656 | 5/1988 | Revlett ........................ 16/111 R |
| 4,926,523 | 5/1990 | Carlson et al. .............. 16/125 |
| 5,127,131 | 7/1992 | Corrigan et al. . |
| 5,184,862 | 2/1993 | Theobald ..................... 16/114 R |
| 5,193,244 | 3/1993 | Meyers ......................... 16/114 R |
| 5,303,451 | 4/1994 | Graviss et al. ............... 16/125 |
| 5,355,554 | 10/1994 | Magoon . |
| 5,358,326 | 10/1994 | Cherry et al. . |
| 5,402,553 | 4/1995 | Goetz et al. .................. 16/114 R |
| 5,412,839 | 5/1995 | McCollom ................... 16/111 R |
| 5,433,416 | 7/1995 | Johnson ....................... 403/381 |
| 5,479,675 | 1/1996 | Pytlewski .................... 16/114 R |

FOREIGN PATENT DOCUMENTS

| | | | |
|---|---|---|---|
| 936412 | 9/1963 | United Kingdom ............. 16/111 R |
| 1041884 | 9/1966 | United Kingdom ............. 16/125 |
| 1098316 | 1/1968 | United Kingdom ............. 16/114 R |
| 1459219 | 12/1976 | United Kingdom ............. 16/DIG. 24 |

OTHER PUBLICATIONS

Whirlpool "Use and Care Guide".

*Primary Examiner*—Randolph A. Reese
*Assistant Examiner*—Donald M. Gurley
*Attorney, Agent, or Firm*—Pearne, Gordon, McCoy and Granger LLP

[57] ABSTRACT

An improved handle assembly for a refrigerator door including a mounting button secured to a face of the refrigerator door, a mounting block secured to a first or lower end of a door handle, and a mounting bracket integrally formed with a second or top end of the door handle. The mounting block and mounting button cooperate to provide a dovetail-type connection wherein the first end of the refrigerator door handle is slidably secured to a face of the refrigerator door without any exposed mechanical connection. The mounting bracket includes openings through which screws may be inserted to secure the second end of the door handle to a top surface of the refrigerator door.

14 Claims, 2 Drawing Sheets

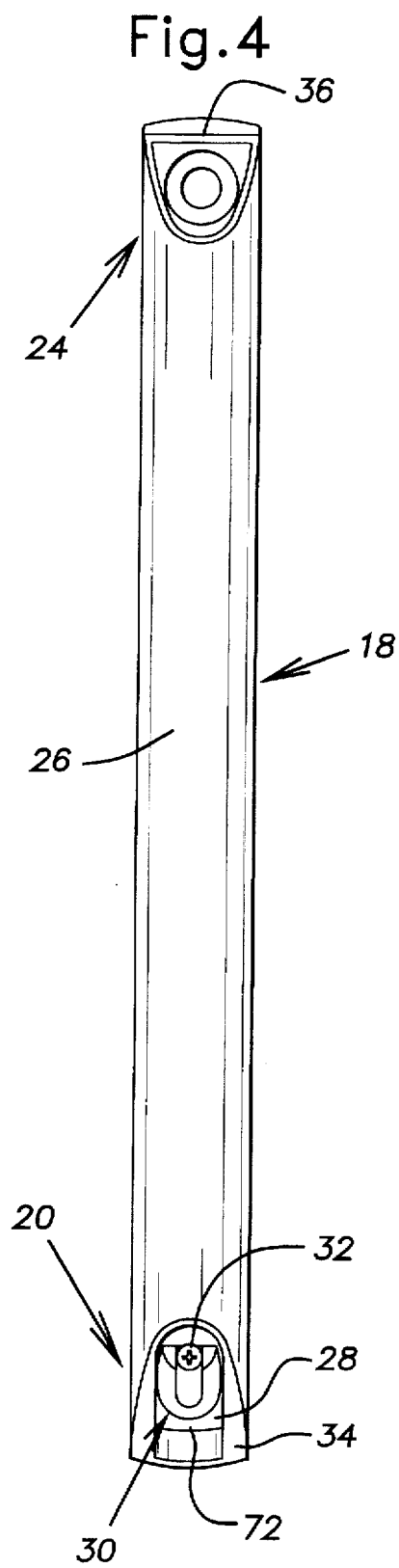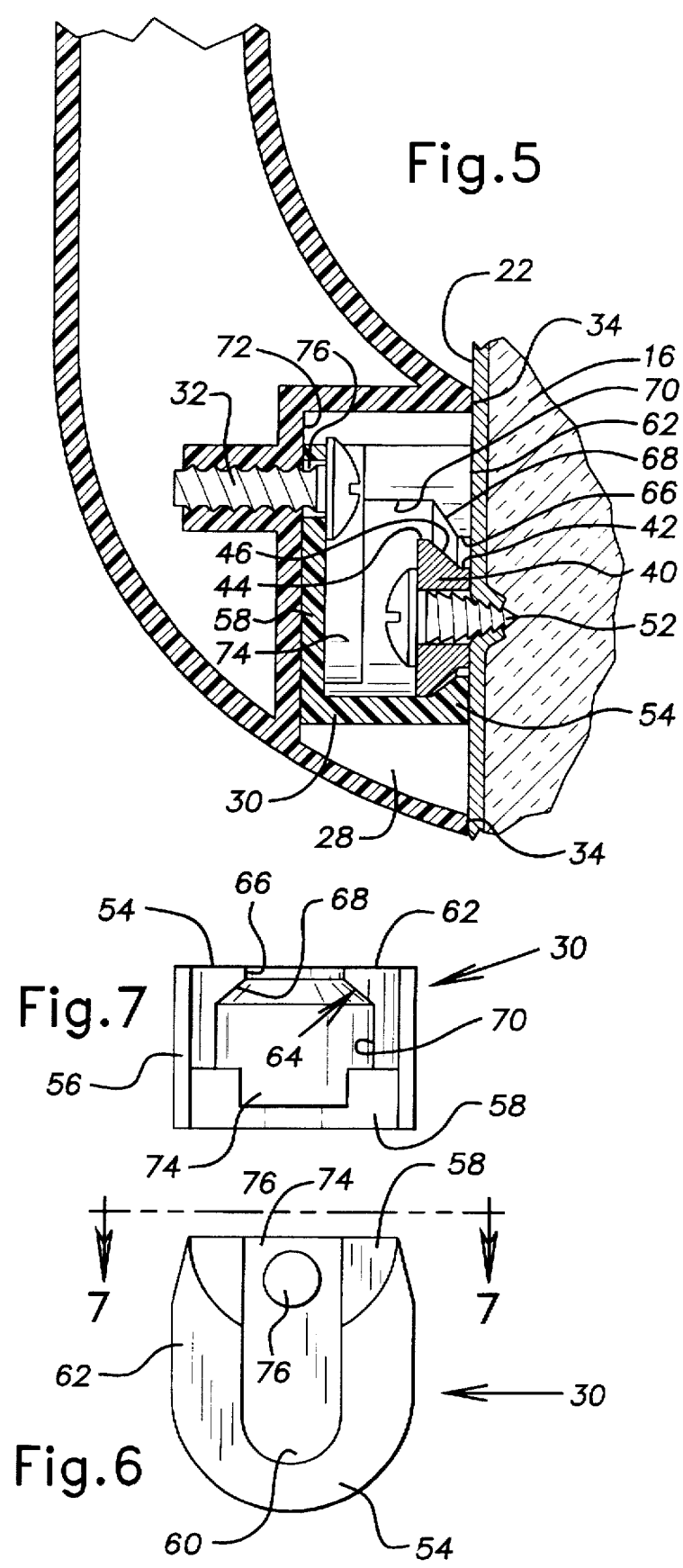

5,797,164

DOVETAIL REFRIGERATOR DOOR HANDLE LOCK

BACKGROUND OF THE INVENTION

1. Field of the Invention

The present invention pertains to door handles and, more particularly, to handle assemblies for refrigerator doors.

2. Description of Related Art

During the development of refrigerators, mounting of the pull handle for refrigerator and/or freezer doors has always been problematic. Part of the problem with refrigerator door handles is that they must have a long useful life, while being aesthetically pleasing to the user. As a solution to this two-part problem, numerous door handles and handle mounting assemblies have been proposed.

For example, U.S. Pat. No. 5,402,553 discloses a handle mounting assembly including a mounting bracket and a handle wherein the handle is moved laterally to insert the handle into the mounting bracket. Screws are inserted from the top and bottom into a space between the mounting bracket and the handle to prevent lateral movement of the handle relative to the mounting bracket which would result in removal of the handle. U.S. Pat. No. 3,648,411 discloses a similar arrangement wherein a mounting bracket is secured at the face of the refrigerator door and a handle is snap-fit into the mounting bracket.

There exists a need in the art for an improved refrigerator door handle assembly wherein the resulting handle is both aesthetically pleasing and functionally superior to the door handle assemblies presently known in the art. Moreover, there exists a need in the art for an improved pull handle assembly for a refrigerator door which is mounted, at one end, to a face of the door and, at an opposite end, to a top surface of the door, and wherein no fasteners are visible on the face of the door.

SUMMARY OF THE INVENTION

The present invention provides a refrigerator door handle assembly which is aesthetically pleasing and which securely mounts a door handle to a face and top of the refrigerator door.

In accordance with the present invention, the door handle assembly includes a refrigerator door handle, a mounting block, and a mounting button. The mounting button is secured to a face of the refrigerator door. The mounting block is secured to a first end of the door handle and over the mounting button. A second end of the door handle is secured to a top surface of the door.

A door handle of the present invention includes the first end which securely receives the mounting block and the second end from which a mounting bracket extends. The mounting bracket preferably extends generally perpendicularly to the length of the refrigerator door handle and includes apertures through which mounting screws may be inserted to secure the second end of the refrigerator door handle to the refrigerator door.

In accordance with the present invention, a dovetail-type joint connection is formed between the mounting button and the mounting block. The mounting button includes a frustoconical outer surface. The mounting block defines a dovetail groove or slot for engagement with the outer surface of the mounting button, and is preferably formed of a material that will elastically spread or expand when the mounting button is slidably inserted into its dovetail slot or groove, to securely attach the first end of the refrigerator door handle to the mounting button.

In accordance with the present invention, a refrigerator door handle assembly is provided wherein no mechanical fasteners are visible on the face or front of the refrigerator door, and wherein the door handle is easily mounted to the door.

During assembly, the mounting button is secured to the face of the door by a mechanical fastener, and then the first end of the refrigerator door handle, with the mounting block secured thereto, is placed over the mounting button. The handle is angled relative to vertical to locate the second end of the handle outboard of the refrigerator door and prevent engagement of the handle second end with the door. The handle is moved vertically upward relative to the mounting button to insert the button into the dovetail slot defined by the mounting block. The handle is then pivoted about the mounting button until the handle is vertically aligned and the mounting bracket at the second end of the handle is slightly spaced from the top surface of the door. The handle is moved vertically downward a short distance to bring the mounting bracket into flush engagement with the top surface of the refrigerator door. Thereafter, screws are inserted through mounting apertures in the mounting bracket and into the refrigerator door top surface to secure the second end of the refrigerator door handle to the refrigerator door.

BRIEF DESCRIPTION OF THE DRAWINGS

These and further features of the present invention will be apparent with reference to the following description and drawings, wherein:

FIG. 4 is a rear elevational view of the refrigerator door handle including a mounting block according to the present invention;

FIG. 5 is an elevational view, in cross-section, of the door handle and mounting block secured over the mounting button;

FIG. 6 is an elevational view of the mounting block according to the present invention; and FIG. 7 is a plan view of the mounting block, as seen along line 7—7 of FIG. 6.

DETAILED DESCRIPTION OF THE PREFERRED EMBODIMENT

Figure 1:
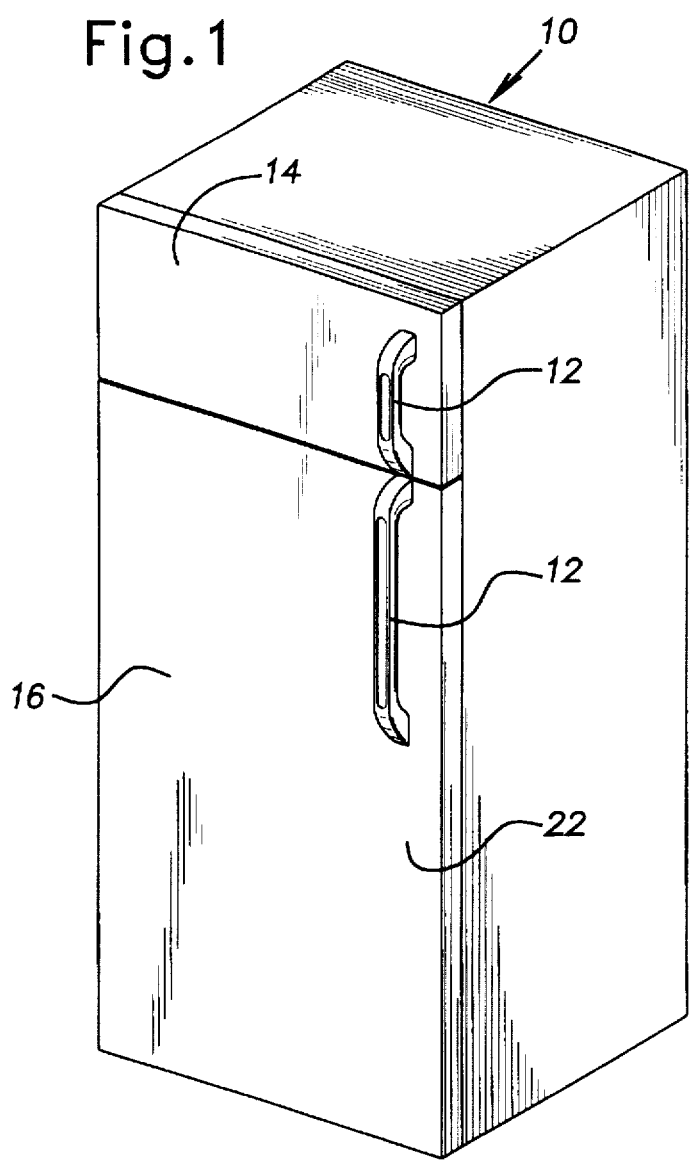
FIG. 1 is a perspective view of a refrigerator incorporating a pair of handle assemblies according to the present invention.

With reference to FIG. 1, a refrigerator 10 incorporating a pair of handle assemblies 12 according to the present invention is shown. The illustrated refrigerator 10 has handle assemblies according to the present invention mounted to both the upper, or freezer door 14, which encloses a freezer compartment, and a lower, or refrigerator door 16, which encloses a refrigeration compartment. Hereafter, the handle assembly 12 will be discussed only as it relates to the refrigerator door 16, the discussion being equally applicable to the handle assembly mounted to the freezer door 14. It is further considered apparent that the handle assembly 12 to be described hereafter is capable of use on side-by-side refrigerators wherein the refrigerator and freezer compartments are laterally offset.

Figure 3:
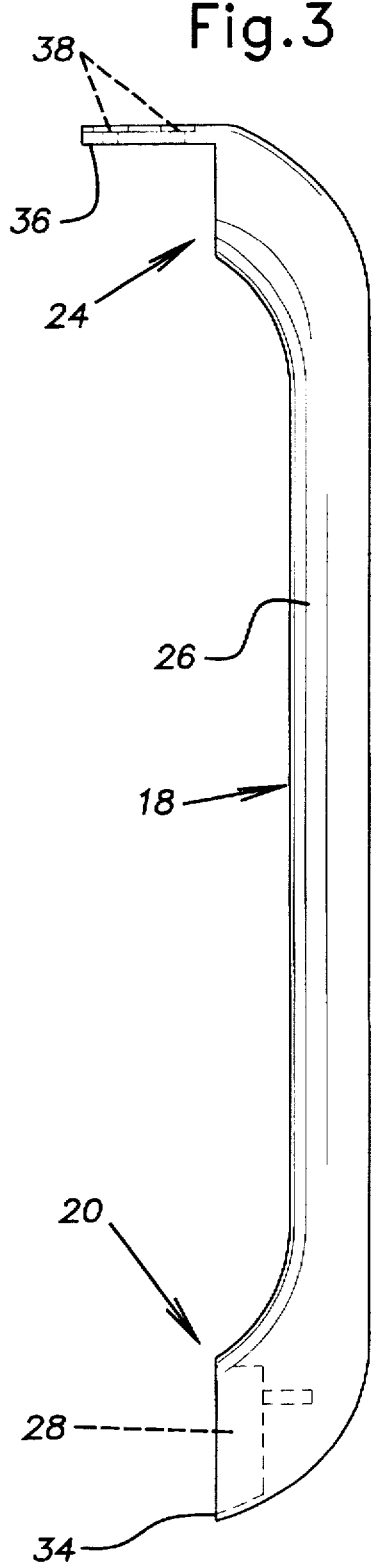
FIG. 3 is a side elevational view of a refrigerator door handle according to the present invention.

With reference to FIG. 3, the handle assembly 12 is shown to include a door handle 18 having a first end 20 adapted for mounting to a face or front 22 of the refrigerator door 16 and a second or opposite end 24 adapted for mounting to a top surface (not shown) of the refrigerator door. Intermediate the first and second ends 20, 24 is a gripping portion 26 which the user may grasp to pull (or push) the door 16 open (or closed). The handle is preferably formed from a strong, stable, and damage resistant material, such as ABS plastic.

As shown in FIGS. 3–5, a first end 20 of the door handle 18 has a recess 28 which receives a mounting block 30. The mounting block is secured to the handle first end 20 by a mechanical fastener, such as mounting screw 32. The first end 20 of the door handle 18 extends away from, or perpendicular to, the length of the gripping portion 26, and includes a generally planar engagement surface 34 which engages or mates with the face 22 of the refrigerator door (FIG. 5).

Likewise, the second end 24 of the door handle 18 includes a mounting bracket 36 which extends generally perpendicular to the length of the gripping portion 26 of the door handle. The mounting bracket 36 has a low profile which facilitates unobtrusive mounting to the top side or upper surface of the refrigerator door 16, and includes a pair of mounting apertures 38 through which mechanical fasteners, such as screws (not shown), may be inserted to secure the mounting bracket 36 to the top side of the refrigerator door 16.

Figure 2:
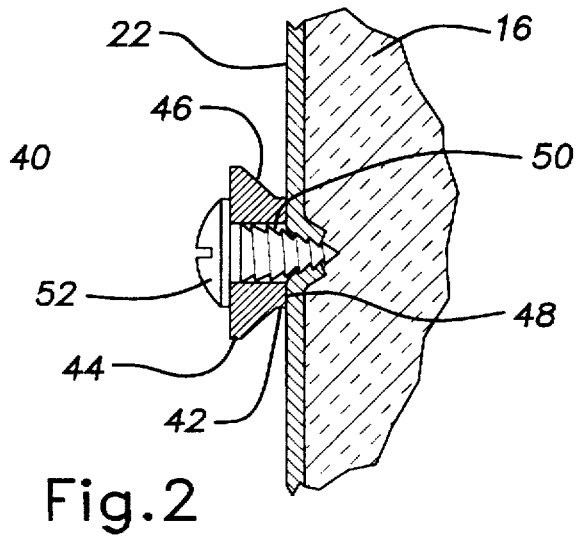
FIG. 2 is a side elevational view, in cross-section, of a mounting button secured to a face of the refrigerator door.

Mounted to the face 22 of the refrigerator door, as shown in FIGS. 2 and 5, is a mounting button 40. The mounting button 40 is preferably formed from nylon or other suitable material, and provides a radial outer surface which includes a proximal annular surface 42 and a distal annular surface 44 which are connected by an intermediate frustoconical surface 46. Preferably, the frustoconical surface 46 is at an angle of between about 45° and 50° and, more preferably, is about 47°.

A smaller diameter end of the frustoconical surface 46 is adjacent the proximal annular surface 42, and a larger diameter end of the frustoconical surface 46 is adjacent the distal annular surface 44, as illustrated. More specifically, the proximal annular surface 42 has a diameter equal to that of the smaller diameter end of the frustoconical surface 46, while the distal annular surface 44 has a diameter equal to that of the larger diameter end of the frustoconical surface 46.

The proximal annular surface 42 is proximate or adjacent the face 22 of the refrigerator door 16 and the distal annular surface 44 is generally remote or spaced-from the face 22 of the refrigerator door 16, as illustrated in FIGS. 2 and 5. An end surface 48 of the mounting button 40 is in face-to-face contact with the face 22 of the refrigerator door. The mounting button also provides an axial bore 50 through which a screw 52 extends. Alternatively, the mounting button 40 may be secured to the refrigerator door 16 by numerous equivalent means, such as a snap lock or push-in type bayonet connection.

With reference to FIGS. 5–7, the mounting block 30 includes a U-shaped top or first wall 54, a U-shaped sidewall 56, and a bottom or second wall 58. The first wall 54 is open at one end to permit placement of the mounting block 30 over the mounting button 40, and defines a U-shaped slot 60, as illustrated.

The first wall 54 includes a planar outer surface 62 and an inner surface 64. The inner surface 64 surrounds the U-shaped slot and includes a first portion 66, which is generally perpendicular to the outer surface 62, and a second portion 68, which is sloped or angled relative to the first portion 66 and the outer surface 62. The second portion 68 interconnects the first portion 66 with an inner surface 70 of the U-shaped sidewall 56, as shown best in FIG. 7.

The first portion 66 defines a first constant-width portion of the slot 60, and the sidewall inner surface 70 defines a second constant-width portion of the slot 60. The second portion 68 defines a varying-width portion of the slot 60 which increases from a first end adjacent first constant-width portion of the slot 60, to a second end adjacent the second constant width portion of the slot 60, as shown best in FIG. 7. The second portion 68 preferably slopes at an angle between about 40° and 50° and, more preferably, is about 45°.

Preferably, the first constant-width portion of the slot 60 is of a size slightly less than or generally equal to the diameter of the proximal annular surface 42 of the mounting button 40. The second constant-width portion of the slot 60 is of a size generally equal to the diameter of the distal annular surface 44 of the mounting button 40.

As such, the first wall inner surface 64 and sidewall inner surface 70 cooperate to define the width or lateral dimensions of the slot 60, and cooperate to receive the mounting button 40 in an interference-type fit, as will be described more fully hereafter.

The mounting block second wall 58 engages a planar surface 72 of the handle first end 20 which defines the bottom of the recess 28. The second wall 58 has an elongated slot 74 formed in an inner surface thereof (i.e., facing the first wall 54), and a mounting opening 76 extending therethrough. The mounting opening 76 receives the mounting screw 32, and the head of the screw 32 lies within the slot 74, as illustrated in FIG. 5. As such, the mounting screw 32 does not obstruct insertion of the mounting button 40 into the mounting block 30.

When the mounting button 40 is inserted into the slot 60 in the mounting block 30, the proximal annular surface 42 engages the first portion 66 of the first wall inner surface 64, the frustoconical surface 46 engages the second portion 68 of the first wall inner surface 64, and the distal annular surface 44 engages the sidewall inner surface 70. As noted elsewhere, the mounting block 30 is preferably formed of a material, such as nylon, which will resiliently expand or stretch upon insertion of the mounting button 40 therein to securely fasten the mounting block 30 to the mounting button 40 in an interference-type fit wherein the mounting block 30 is in tension and the mounting button 40 is in compression. It is believed that the engagement between the frustoconical surface 46 and the second portion 68 of the first wall inner surface 64 may also cause or create a slight camming action which will draw the first end 20 of the door handle 18 toward the refrigerator door 16.

Assembly of the handle 18 to the refrigerator door 16 will be described hereafter, with it being apparent that the mounting button 40 is initially secured to the face 22 of the refrigerator door, as shown in FIG. 2, and the mounting block 30 is initially secured to the first end 20 of the door handle 18, as shown in FIG. 4.

The handle 18 is angled relative to vertical to place the handle second end 24 laterally outboard of the refrigerator door 16 and thereby prevent engagement of the mounting bracket 36 with the refrigerator door 18. With the handle in such an angled position, the mounting block 30 is placed over the mounting button 40 such that the button 40 is located at the open end of the U-shaped slot 60. The handle 18 and mounting block 30 are moved laterally and vertically upward relative to the mounting button 40 (i.e., generally parallel to the longitudinal axis of the handle) to insert the mounting button 40 into the U-shaped slot 60 of the mounting block 30.

As such, the frustoconical surface 46 of the mounting button 40 is in contact with the sloped second portion 68 of the inner surface 64 of the mounting block first wall 54. The proximal annular surface 42 is in sliding, face-to-face contact with the first portion 66 of the inner surface 64 of the mounting block first wall 54. The distal annular surface 46 is in sliding contact with the inner surface 70 of the sidewall 56. The engagement between the mounting block 30 and mounting button 40 defines an interference or dovetail-type fit or connection to secure the handle 18 to the refrigerator door 16.

As the mounting button 40 is inserted further into the U-shaped slot 60, the mounting block 30 will resiliently expand or stretch to hold the mounting button 40 in an interference-type fit and draw the first end 20 of the door handle 18 toward the door 16, as described hereinbefore.

Once the mounting button 40 is completely inserted into the mounting block slot 60, the handle 18 is rotated or pivoted about the mounting button 40 to place the handle 18 in vertical alignment wherein the mounting bracket 36 overlies, and is spaced slightly vertically above, the top surface of the refrigerator door 16. Then the handle 18 is moved vertically downward a short distance until the handle mounting bracket 36 is in flush engagement with the top or upper surface of the refrigerator door 16, at which point the first end 20 of the handle 18 is generally as shown in FIG. 5. A pair of screws are then inserted through the mounting apertures 38 in the mounting bracket 36 and into the refrigerator door top surface to complete attachment of the door handle to the refrigerator door.

As such, the handle assembly 12 of the present invention provides a simple and aesthetically pleasing door handle for a refrigerator door. No fasteners or means of mechanical connection are visible to the user on the face 22 of the refrigerator door, or when the door is closed.

The foregoing description has been provided to illustrate the preferred embodiment currently contemplated by the inventor, and is not intended to limit the scope of the claims appended hereto to the invention specifically shown and described. It is contemplated that numerous additions, deletions, modifications, substitutions, and rearrangements of the parts may be employed without departing from the scope and spirit of the present invention, as defined by the claims appended hereto. For example, although a separate mounting block is disclosed as being preferred, it is contemplated that the mounting block may be integrally formed with the first end of the refrigerator door handle. Also, it is contemplated that the arrangement of the mounting block and mounting button may be reversed such that the mounting block is secured to the face of the refrigerator door and the mounting button is secured to, or integrally formed with, the first end of the refrigerator door handle. Furthermore, it is contemplated that the orientation of the mounting block 30 relative to the handle 18 may be altered such that the mounting button is inserted into the mounting block slot 60 by downward (or lateral) movement of the handle and mounting block relative to the mounting button 40, rather than the combination of vertical, lateral, and pivotal movement specifically described herein.

What is claimed is:

1. A handle assembly for a refrigerator door, comprising a mounting button, a mounting block, and a handle, said handle having a first end to which one of said mounting block or mounting button is secured, the other of said mounting block or mounting button being secured to the refrigerator door, said mounting button having a frustoconical outer surface, said mounting block defining a slot having a closed end and into which said mounting button is inserted, wall surfaces surrounding said slot being angled to cooperate with and engage said frustoconical outer surface of said mounting button at said closed end of said slot, wherein at least one of said mounting button and said mounting block comprises a compressible resilient material and angled wall surfaces of said mounting block and said frustoconical outer surface of said mounting button cooperate to provide an interference-type connection which secures said handle first end to the refrigerator door.

2. A handle assembly for a refrigerator door according to claim 1, wherein said handle has a second end including a mounting bracket, said mounting bracket being secured to the refrigerator door by a mechanical fastener.

3. A handle assembly for a refrigerator door according to claim 1, wherein the mounting button is secured to the refrigerator door and the mounting block is secured to the first end of said handle.

4. A handle assembly for a refrigerator door according to claim 1, wherein the mounting block defines a slot into which the mounting button is inserted.

5. A handle assembly for a refrigerator door according to claim 4, wherein surfaces of a wall surrounding the slot are angled such that one portion of the slot has a first width and another portion of the slot has a second width, the first width being different than the second width.

6. A handle assembly for a refrigerator door according to claim 1, wherein the mounting button is secured to the refrigerator door and the mounting block is secured to the first end of said handle.

7. A handle assembly for a refrigerator door according to claim 6, wherein engagement between the mounting block and the mounting button defines a dovetail-type connection.

8. The handle assembly according to claim 1, wherein the button is nylon.

9. A handle assembly for a refrigerator door, comprising:

a mounting button secured to the refrigerator door and having a frustoconical outer surface;

a handle having a first end and a second end, the first end including a mounting block and the second end including a mounting bracket, said mounting block defining a slot having a closed end, wall surfaces surrounding said slot being angled to cooperate with and engage said frustoconical outer surface of said mounting button at said closed end of said slot, wherein at least one of said mounting button and said mounting block comprises a compressible resilient material and said mounting block is adapted to be slidably attached to said mounting button with said wall surfaces engaging said frustoconical outer surface to thereby secure the first end of the handle to the door.

10. A handle assembly for a refrigerator door according to claim 9, wherein the mounting bracket is secured to the door by a mechanical fastener.

11. A handle assembly for a refrigerator door according to claim 9, wherein the mounting block defines a slot into which the mounting button is inserted.

12. A handle assembly for a refrigerator door according to claim 11, wherein surfaces of a wall surrounding the slot are angled such that one portion of the slot has a first width and another portion of the slot has a second width, the first width being different than the second width.

13. A handle assembly for a refrigerator door according to claim 12, wherein engagement between the mounting block and the mounting button defines a dovetail-type connection.

14. The handle assembly according to claim 9, wherein the button is nylon.

* * * * *